United States Patent
Iwasaki (10) Patent No.: US 7,283,259 B2
(45) Date of Patent: Oct. 16, 2007

(54) IMAGE DATA RECORDING DEVICE, METHOD FOR CONTROLLING IMAGE DATA RECORDING DEVICE, AND A PROGRAM FOR CONTROLLING AN IMAGE DATA RECORDING SYSTEM, EACH USING A COMMON KEY

(75) Inventor: Osamu Iwasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 09/770,248

(22) Filed: Jan. 29, 2001

(65) Prior Publication Data

US 2002/0036789 A1  Mar. 28, 2002

(30) Foreign Application Priority Data

Jan. 31, 2000  (JP)  .............................. 2000-022393

(51) Int. Cl.
  *G06F 15/00*  (2006.01)
  *G06K 1/00*  (2006.01)
  *H04L 9/00*  (2006.01)
(52) U.S. Cl. .................... 358/1.14; 358/1.14; 358/1.15; 713/161
(58) Field of Classification Search ................. 358/1.1, 358/1.9, 1.11–1.18; 713/151, 161, 201
See application file for complete search history.

(56) References Cited

U.S. PATENT DOCUMENTS

| 5,502,575 | A | | 3/1996 | Kai et al. .................... 358/405 |
| 5,574,789 | A | * | 11/1996 | Nakamura et al. .......... 380/262 |
| 5,633,932 | A | * | 5/1997 | Davis et al. ................. 713/176 |
| 5,982,506 | A | | 11/1999 | Kara .......................... 358/405 |
| 6,711,677 | B1 | * | 3/2004 | Wiegley ..................... 713/151 |
| 2005/0097323 | A1 | * | 5/2005 | Lapstun et al. ............. 713/168 |

FOREIGN PATENT DOCUMENTS

| EP | 0 665 486 A2 | 8/1995 |
| JP | 6-105141 | 4/1994 |

* cited by examiner

*Primary Examiner*—Gabriel Garcia
*Assistant Examiner*—Thierry L. Pham
(74) *Attorney, Agent, or Firm*—Fitzpatrick, Cella, Harper & Scinto (57) ABSTRACT

A computer generates a print ID based on input image data on which a forgery preventing process is performed, and transfers the print ID to a printer. The printer generates a common key corresponding to the print ID, and transfers it to the computer. The computer encrypts the image data using a common key, represents it as a print control command, and transfers the data with the print ID to the printer. The printer analyzes the command of the print control data, extracts the encrypted print image data, decrypts the data using the common key, and stores the decrypted print image data in a storage medium, thereby preventing the data from being printed on a number of unspecified printers.

7 Claims, 6 Drawing Sheets

IMAGE DATA RECORDING DEVICE, METHOD FOR CONTROLLING IMAGE DATA RECORDING DEVICE, AND A PROGRAM FOR CONTROLLING AN IMAGE DATA RECORDING SYSTEM, EACH USING A COMMON KEY

BACKGROUND OF THE INVENTION

1. Field of the Invention

The present invention relates to an image processing apparatus for preventing the forgery of bills, etc. in a recording system for processing an image in a host computer and printing the image on a recording device.

2. Related Background Art

Many systems for preventing the forgery of bills, valuable securities, etc. are designed as input/output device built-in systems such as copying units, etc. However, with an increasing number of personal computers, high-performance peripheral devices such as a scanner, a digital camera, a printer, etc. have been developed. As a result, with these high-performance peripheral devices, the personal computers can output an image at a quality level higher than an image output by the input/output device built-in copying units. Thus, in a personal computer environment, a forgery preventing system is required.

As a characteristic of a forgery preventing system in the personal computer environment, a host computer controls input and output devices. Therefore, it is necessary to allow an image process program of the host computer to recognize specified patterns of bills, valuable securities, etc. A personal computer can output data without a specific image process program only if it is informed of the control code of the output device.

Figure 2:
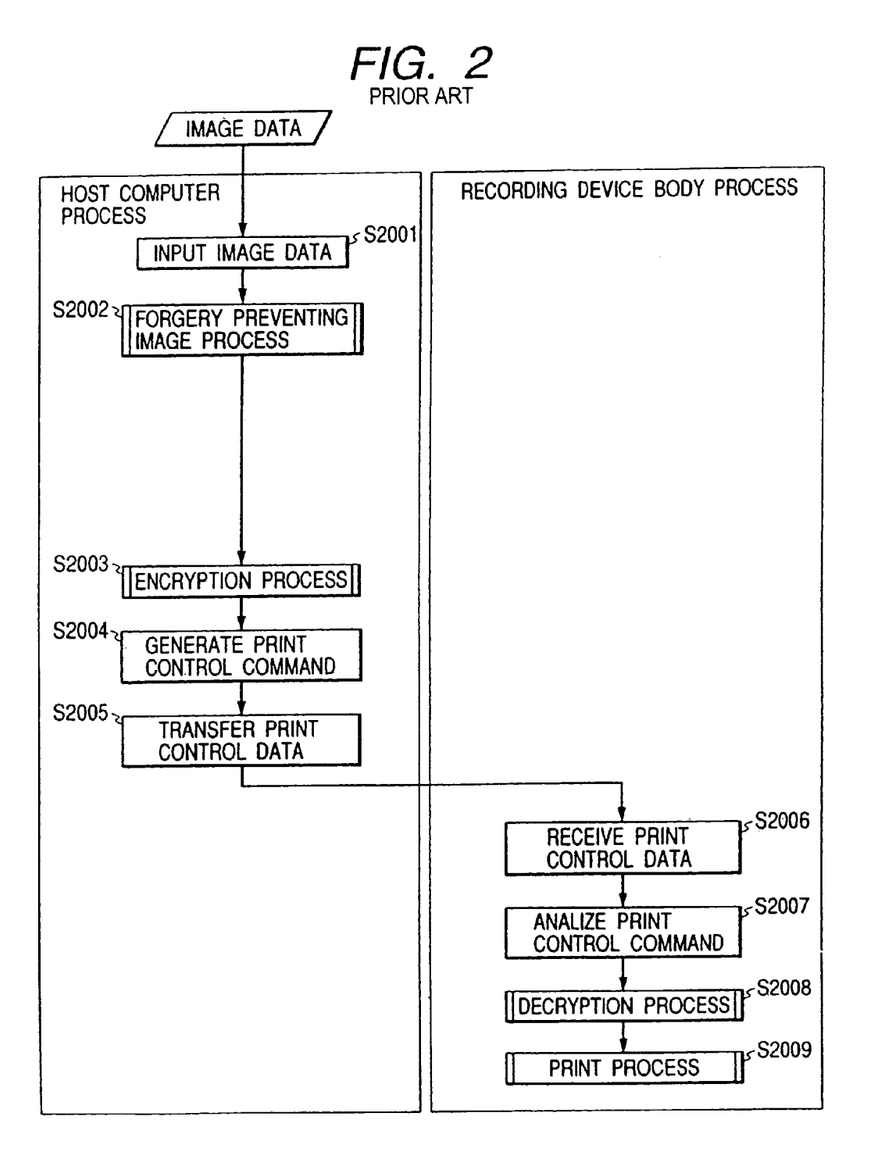
FIG. 2 is a flowchart of the procedure of the encryption process according to the recording system of the conventional technology.

Accordingly, a method of encrypting the control code of the output device is effective to prevent the use of a program other than the specific image process program for a forgery preventing process. The above mentioned method is disclosed by, for example, by Japanese Patent Application Laid-Open No. 6-105141 although not in the personal computer environment. FIG. 2 shows an example when this method is applied to the personal computer environment.

In FIG. 2, the processes in steps S2001 to S2005 are performed by the host computer, and the processes in steps S2006 to S2009 are performed by the recording device.

In the first step S2001, image data is input from an OS (basic software) or an application. Then, in step S2002, an image process including a forgery preventing process is performed. The image process in step S2002 includes color matching, gamma correction, and quantizing processes to convert an input image into print image data. In the forgery preventing process in step S2002, determination is normally made on a specified image by performing a pattern recognizing process. If the input image matches the specified image, then an error process is performed on the image data.

Then, the print data on which an image process has been performed is encrypted in step S2003. The encrypted print data is converted into print control data as a command for control of a printer in step S2004.

The print control data as a command is transferred to the printer by controlling (control can be practically performed by the OS) the data transfer circuit (not shown in the attached drawings) in step S2005.

Next, in step S2006, the printer receives the print control data. A command analyzing process is performed on the received print control data in step S2007, and encrypted print image data is generated.

Then, the encrypted print image data is converted into print data in a decryption process in step S2008, and the decrypted print data is printed on a storage medium in step S2009.

However, since in the above mentioned system which performs the encryption process between the host computer and the printer, there is an one to one correspondence between the input image and the data transferred to the printer, the encrypted data can be easily decrypted.

That is, it is the same as the case where the control code of the printer used in the conventional system is not open, and there is a problem that the image forgery preventing process cannot be effectively performed.

SUMMARY OF THE INVENTION

An object of the present invention is to solve the above mentioned problems, and provide an improved image processing apparatus and method.

Another object of the present invention is to provide an image processing apparatus and method capable of effectively performing a forgery preventing process on an input image.

A further object of the present invention is to provide an image processing apparatus and method by hardening the decryption of a forgery preventing process.

A further object of the present invention is to provide an image processing apparatus and method capable of effectively preventing a print process performed by a number of unspecified image recording devices by encrypting print control data for controlling an image recording device using a common key issued by an image recording device when the image recording device is allowed to print an image, and by disabling any other image recording devices than the image recording device by which the common key has been generated to record the image.

Further objects of the present invention will be clearly described by the following explanation based on the attached drawings and the claims.

DETAILED DESCRIPTION OF THE PREFERRED EMBODIMENTS

First Embodiment

The embodiments of the present invention are described below in detail by referring to the attached drawings.

Figure 1:
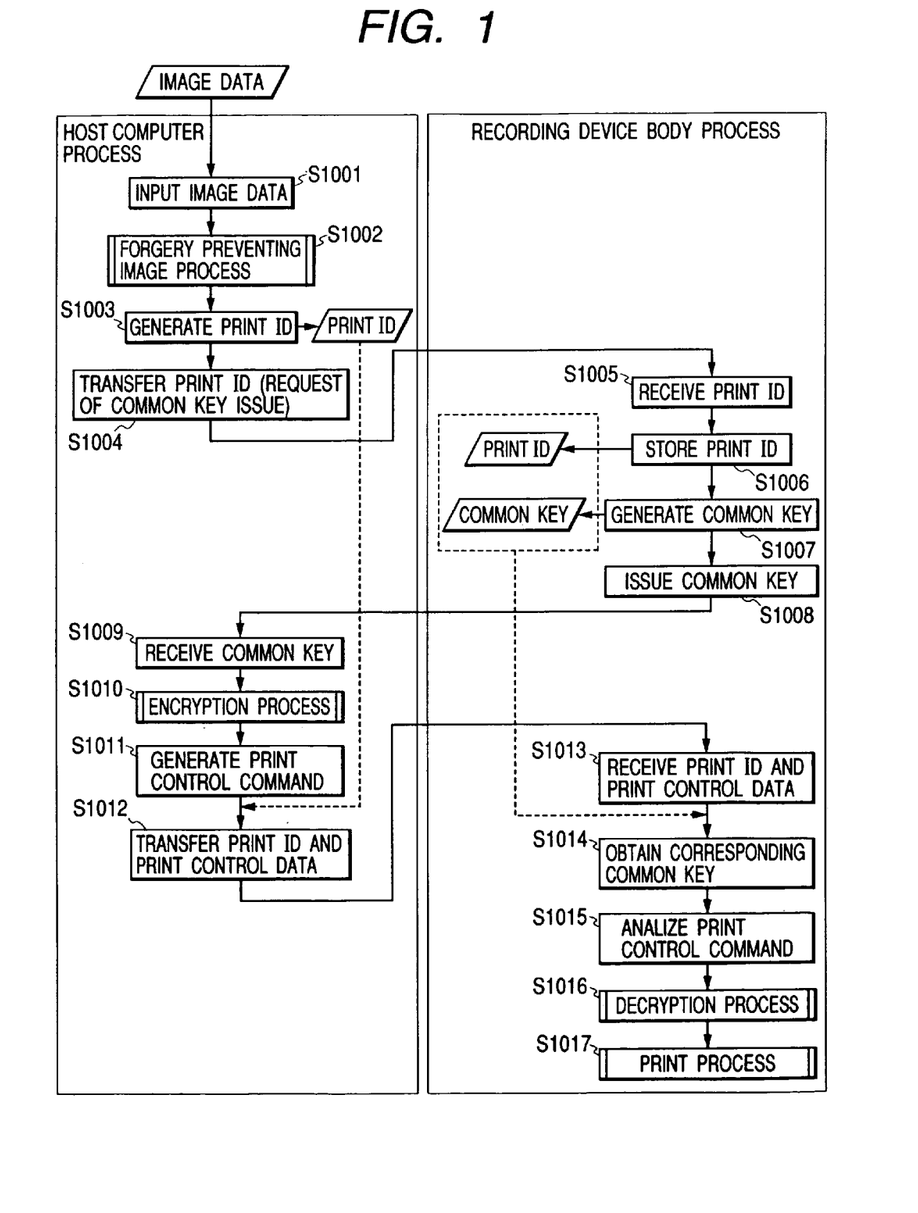
FIG. 1 is a flowchart of the procedure of the operations of the recording system according to the first embodiment of the present invention.

FIG. 1 is a flowchart of the procedure of processing data in the recording system according to the present invention.

In FIG. 1, the processes in steps S1001 to S1004 and steps S1009 to S1012 are performed by a host computer. The processes in steps S1005 to S1008 and steps S1013 to S1017 are performed by s recording device.

In the first step S1001, image data is input. Then, in step S1002, an image process including a forgery preventing process is performed.

Next, in step S1003, a print ID is generated, and then the print ID is transferred to a recording device in step S1004.

Next, in step S1005, the recording device receives a print ID, and stores the received print ID in step S1006.

Next, in step S1007, a common key is generated. At this time, the recording device is managed such that a print ID is paired with a common key.

If a common key is generated in step S1007, it is irregularly generated such that the common key cannot be associated with the value of the print ID.

Then, in step S1008, the generated common key is transmitted to the host computer.

The common key transmitted from the recording device is received by the host computer in step S1009. Thus, since the recording device issues the common key in response to the transfer of the print ID of the host computer, the transfer of the print ID in step S1004 indicates a request to issue a common key.

In step S1010, the print image data generated in the process performed in step S1002 is encrypted by the common key received in step S1009.

Then, in step S1011, the encrypted print image data is converted into a print control command. Then, in step S1012, the print ID and the print control data command are transferred to the recording device side.

In step S1013, the recording device receives a print ID and print control data. Then, in step S1014, the common key corresponding to the received print ID is retrieved and obtained from a managed pair of the print ID and the common key. Then, in step S1015, the command of the print control data is analyzed, and the encrypted print image data is extracted.

Then, in step S1016, the print image data is decrypted using the common key obtained in step S1014. In step S1017, the print image data is stored on the storage medium in the print process.

The print data transferring process in steps S1012 and S1013 and the process in steps S1015 to S1017 can be sequentially repeated in parallel. Although not shown in FIG. 1, the used print ID and the common key paired therewith may be discarded after performing the print process in step S1017.

Figure 3:
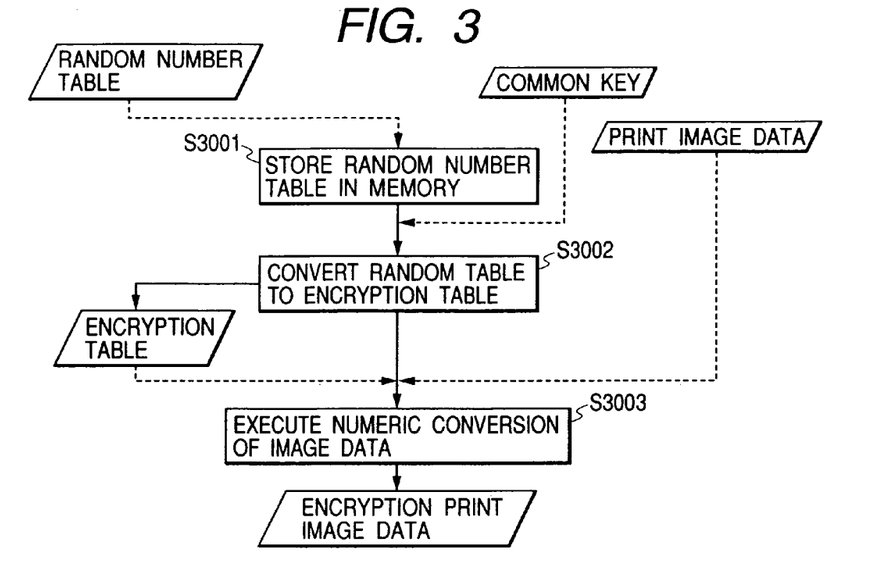
FIG. 3 is a flowchart of the procedure of an encryption process according to the first embodiment of the present invention.

FIG. 3 is a flowchart of the contents of the encryption process performed in step S1010.

The random number table according to this embodiment comprises series of irregularly arranged integers (1-byte length each) of "0" to "255". That is, the table size is 256 bytes. The common key is formed by integers from 0 to 255.

First, in step S3001, a random number table is stored on the memory (RAM) of the host computer. Then, in step S3002, the random number table on the memory (RAM) is converted into an encryption table using a common key.

In step S3003, the print image data is encrypted using the generated encryption table. In this case, the print image data is sequentially read in a byte unit, the data value of one read byte is set as an offset from the leading address of the encryption table, and the value of the corresponding address is set as the encryption print image data.

Figure 5:
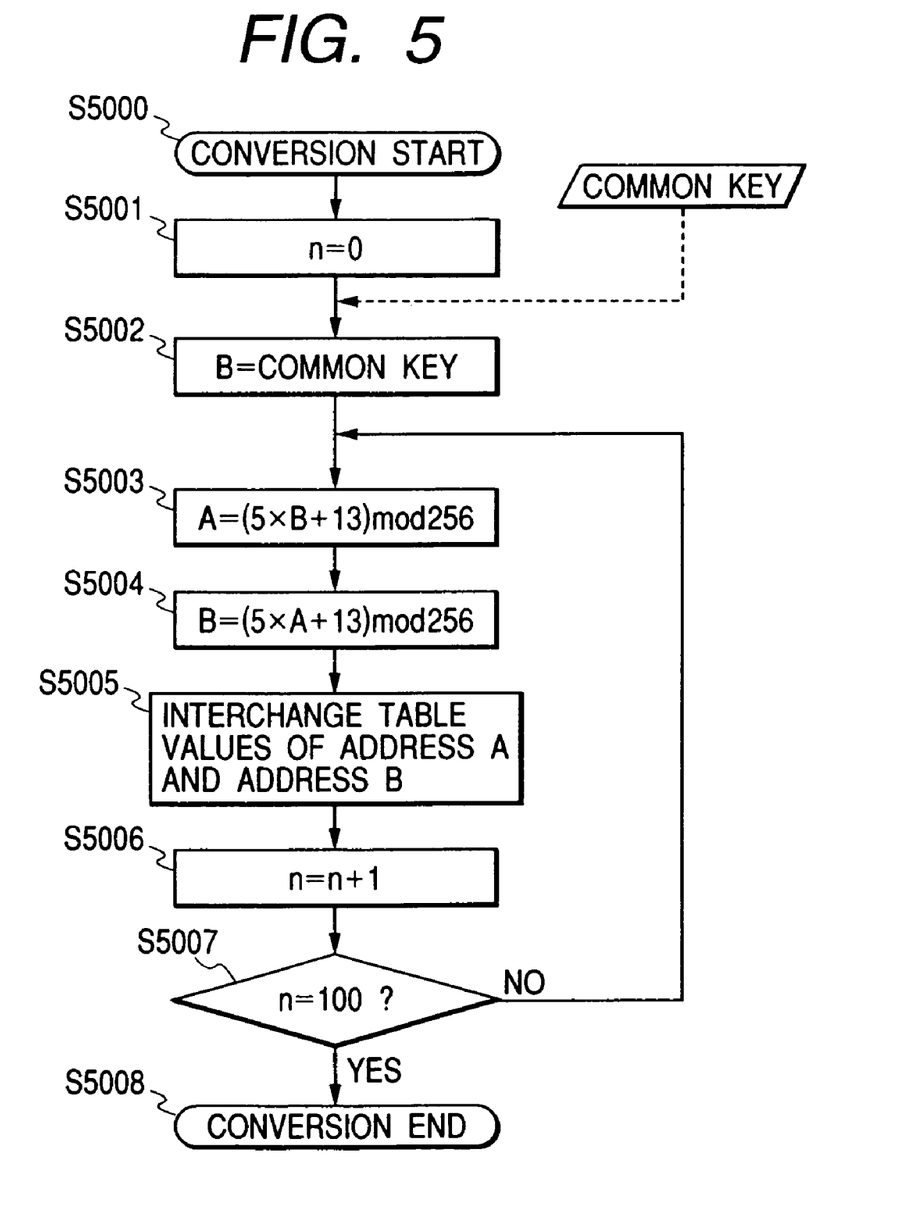
FIG. 5 is a flowchart of the procedure of an encryption table generating process according to the first embodiment of the present invention.

FIG. 5 is a flowchart of the process performed in step S3002.

First, in step S5000, the process is started. then, in step S5001, a variable n is set to "0". The variable n is a management counter for 100 times repetition of the processes in steps S5003 to S5005 described later.

Then, in step S5002, the value of the common key is assigned to a variable B. Then, in step S5003, a variable A is computed using the variable B by the following Equation (1). 'mod' is a well-known function for use in obtaining a residue in a division.

$$A=(5 \times B+13) \bmod 256 \qquad (1)$$

Next, in step S5004, the variable B is computed using the variable A by the following Equation (2).

$$B=(5 \times A+13) \bmod 256 \qquad (2)$$

In the computation by the Equations (1) and (2), pseudo random numbers are generated in a linear congruential method. That is, the common key is used for the initial value in the linear congruential method.

Then, in step S5005, the table value whose offset from the leading address of the random number table stored in the memory in step S3001 is A and the table value whose offset is B are interchanged. Then, in step S5006, n is incremented by 1.

It is determined in step S5007 whether or not n is "100". If it is "100", then control is passed to step S5008, and the converting operation terminates. If it is determined in step S5007 that n is not 100, control is passed to step S5003.

Figure 4:
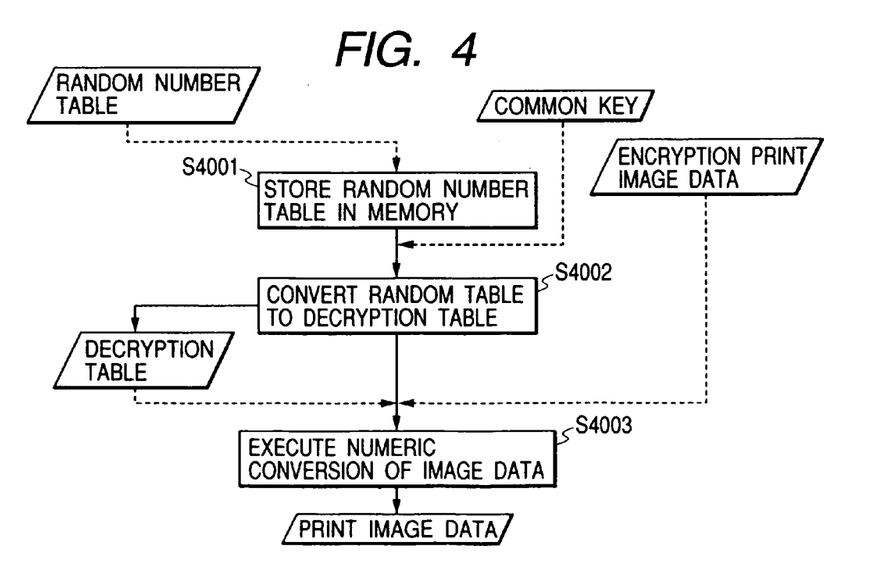
FIG. 4 is a flowchart of the procedure of a decryption process according to the first embodiment of the present invention.

FIG. 4 is a flowchart explaining the procedure of the decryption process performed in step S1016. The random number table used in this embodiment is the same table as that used in the process in step S3001.

First, in step S4001, the random number table is developed on the memory (RAM) of the recording device.

Then, in step S4002, the random number table on the memory (RAM) is converted into a decryption table using a common key. In the obtained decryption table, the offset value from the leading address of the series and the integer stored at the address can be obtained by interchanging the values on the above mentioned encryption table.

For example, when the 25th value from the start of the encryption table is "12", the 12th value from the start of the decryption table is "25" (assume that the start of the table is set to 0).

That is, the encryption table is an inverse conversion table of the decryption table. Assuming that a function A( ) indicates the conversion using the encryption table and a function B( ) indicates the conversion using the decryption table, the following Equations exist.

$$a=A(d),\ d=B(a)$$

Then, the encryption print image data is decrypted using the generated decryption table in step S4003. In step S4003, the encryption print image data is sequentially read in a byte unit. The read 1-byte data value is an offset from the leading address of the encryption table, and the value of the corresponding address is the print image data.

Figure 6:
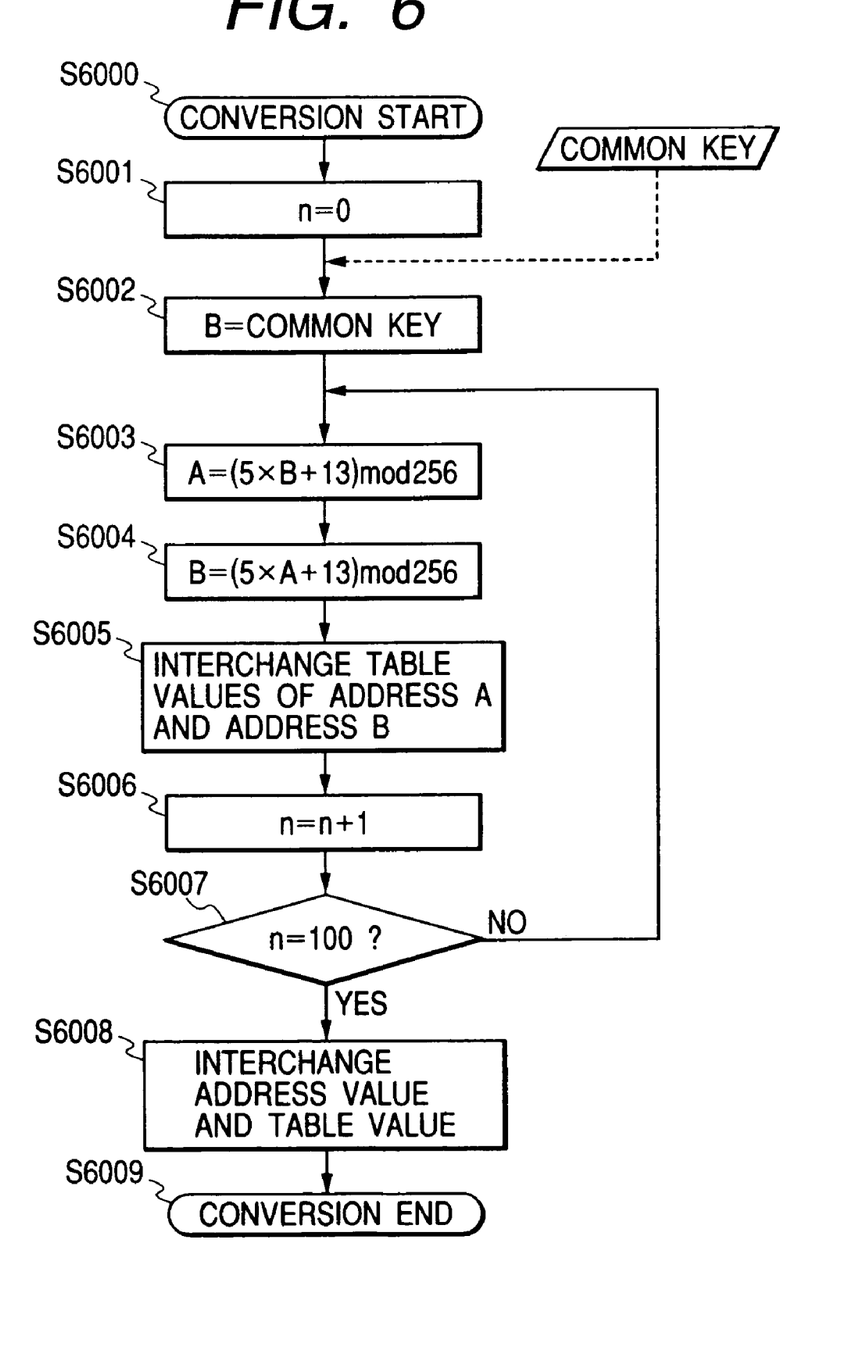
FIG. 6 is a flowchart of the procedure of a decryption table generating process according to the first embodiment of the present invention.

FIG. 6 is a flowchart of the process in step S4002.

In FIG. 6, the processes in steps S6000 to S6007 are the same as the converting operation in steps S5000 to S6007 on the encryption table. After generating the encryption table, the address value and the table value are interchanged in step S6008 for conversion into the decryption table.

The following Tables 1, 2, and 3 are the tables used or generated in this embodiment.

| Random Number Table | |
|---|---|
| x | R(x) |
| 0 | 88 |
| 1 | 197 |
| 2 | 230 |
| 3 | 139 |
| 4 | 196 |
| 5 | 225 |
| 6 | 114 |
| 7 | 71 |
| 8 | 112 |
| 9 | 61 |
| 10 | 62 |
| 11 | 67 |
| 12 | 92 |
| 13 | 217 |
| 14 | 74 |
| 15 | 127 |
| 16 | 136 |
| 17 | 181 |
| 18 | 150 |
| 19 | 251 |
| 20 | 244 |
| 21 | 209 |
| 22 | 34 |
| 23 | 183 |
| 24 | 160 |
| 25 | 45 |
| 26 | 238 |
| 27 | 179 |
| 28 | 140 |
| 29 | 201 |
| 30 | 250 |
| 31 | 239 |
| 32 | 184 |
| 33 | 165 |
| 34 | 70 |
| 35 | 107 |
| 36 | 36 |
| 37 | 193 |
| 38 | 210 |
| 39 | 39 |
| 40 | 208 |
| 41 | 29 |
| 42 | 158 |
| 43 | 35 |
| 44 | 188 |
| 45 | 185 |
| 46 | 170 |
| 47 | 95 |
| 48 | 232 |
| 49 | 149 |
| 50 | 246 |
| 51 | 219 |
| 52 | 84 |
| 53 | 177 |
| 54 | 130 |
| 55 | 151 |
| 56 | 0 |
| 57 | 13 |
| 58 | 78 |
| 59 | 147 |
| 60 | 236 |
| 61 | 169 |
| 62 | 90 |
| 63 | 207 |
| 64 | 24 |
| 65 | 133 |
| 66 | 166 |
| 67 | 75 |
| 68 | 132 |
| 69 | 161 |
| 70 | 50 |
| 71 | 7 |
| 72 | 48 |
| 73 | 253 |
| 74 | 254 |

-continued

| Random Number Table | |
|---|---|
| x | R(x) |
| 75 | 3 |
| 76 | 28 |
| 77 | 153 |
| 78 | 10 |
| 79 | 63 |
| 80 | 72 |
| 81 | 117 |
| 82 | 86 |
| 83 | 187 |
| 84 | 180 |
| 85 | 145 |
| 86 | 226 |
| 87 | 119 |
| 88 | 96 |
| 89 | 237 |
| 90 | 174 |
| 91 | 115 |
| 92 | 76 |
| 93 | 137 |
| 94 | 186 |
| 95 | 175 |
| 96 | 120 |
| 97 | 101 |
| 98 | 6 |
| 99 | 43 |
| 100 | 228 |
| 101 | 129 |
| 102 | 146 |
| 103 | 231 |
| 104 | 144 |
| 105 | 221 |
| 106 | 94 |
| 107 | 227 |
| 108 | 124 |
| 109 | 121 |
| 110 | 106 |
| 111 | 31 |
| 112 | 168 |
| 113 | 85 |
| 114 | 182 |
| 115 | 155 |
| 116 | 20 |
| 117 | 113 |
| 118 | 66 |
| 119 | 87 |
| 120 | 192 |
| 121 | 205 |
| 122 | 14 |
| 123 | 83 |
| 124 | 172 |
| 125 | 105 |
| 126 | 26 |
| 127 | 143 |
| 128 | 216 |
| 129 | 69 |
| 130 | 102 |
| 131 | 11 |
| 132 | 68 |
| 133 | 97 |
| 134 | 242 |
| 135 | 199 |
| 136 | 240 |
| 137 | 189 |
| 138 | 190 |
| 139 | 195 |
| 140 | 220 |
| 141 | 89 |
| 142 | 202 |
| 143 | 255 |
| 144 | 8 |
| 145 | 53 |
| 146 | 22 |
| 147 | 123 |
| 148 | 116 |
| 149 | 81 |

-continued

Random Number Table

| x | R(x) |
|---|---|
| 150 | 162 |
| 151 | 55 |
| 152 | 32 |
| 153 | 173 |
| 154 | 110 |
| 155 | 51 |
| 156 | 12 |
| 157 | 73 |
| 158 | 122 |
| 159 | 111 |
| 160 | 56 |
| 161 | 37 |
| 162 | 198 |
| 163 | 235 |
| 164 | 164 |
| 165 | 65 |
| 166 | 82 |
| 167 | 167 |
| 168 | 80 |
| 169 | 157 |
| 170 | 30 |
| 171 | 163 |
| 172 | 60 |
| 173 | 57 |
| 174 | 42 |
| 175 | 223 |
| 176 | 104 |
| 177 | 21 |
| 178 | 118 |
| 179 | 91 |
| 180 | 212 |
| 181 | 49 |
| 182 | 2 |
| 183 | 23 |
| 184 | 128 |
| 185 | 141 |
| 186 | 206 |
| 187 | 19 |
| 188 | 108 |
| 189 | 41 |
| 190 | 218 |
| 191 | 79 |
| 192 | 152 |
| 193 | 5 |
| 194 | 38 |
| 195 | 203 |
| 196 | 4 |
| 197 | 33 |
| 198 | 178 |
| 199 | 135 |
| 200 | 176 |
| 201 | 125 |
| 202 | 126 |
| 203 | 131 |
| 204 | 156 |
| 205 | 25 |
| 206 | 138 |
| 207 | 191 |
| 208 | 200 |
| 209 | 245 |
| 210 | 214 |
| 211 | 59 |
| 212 | 52 |
| 213 | 17 |
| 214 | 98 |
| 215 | 247 |
| 216 | 224 |
| 217 | 109 |
| 218 | 46 |
| 219 | 243 |
| 220 | 204 |
| 221 | 9 |
| 222 | 58 |
| 223 | 47 |
| 224 | 248 |

-continued

Random Number Table

| x | R(x) |
|---|---|
| 225 | 229 |
| 226 | 134 |
| 227 | 171 |
| 228 | 100 |
| 229 | 1 |
| 230 | 18 |
| 231 | 103 |
| 232 | 16 |
| 233 | 93 |
| 234 | 222 |
| 235 | 99 |
| 236 | 252 |
| 237 | 249 |
| 238 | 234 |
| 239 | 159 |
| 240 | 40 |
| 241 | 213 |
| 242 | 54 |
| 243 | 27 |
| 244 | 148 |
| 245 | 241 |
| 246 | 194 |
| 247 | 215 |
| 248 | 64 |
| 249 | 77 |
| 250 | 142 |
| 251 | 211 |
| 252 | 44 |
| 253 | 233 |
| 254 | 154 |
| 255 | 15 |

TABLE 2

Encryption Table

| x | A(x) |
|---|---|
| 0 | 217 |
| 1 | 197 |
| 2 | 183 |
| 3 | 154 |
| 4 | 165 |
| 5 | 32 |
| 6 | 35 |
| 7 | 246 |
| 8 | 177 |
| 9 | 156 |
| 10 | 207 |
| 11 | 146 |
| 12 | 253 |
| 13 | 88 |
| 14 | 187 |
| 15 | 127 |
| 16 | 136 |
| 17 | 84 |
| 18 | 150 |
| 19 | 138 |
| 20 | 85 |
| 21 | 144 |
| 22 | 83 |
| 23 | 230 |
| 24 | 97 |
| 25 | 12 |
| 26 | 255 |
| 27 | 179 |
| 28 | 173 |
| 29 | 200 |
| 30 | 235 |
| 31 | 94 |
| 32 | 57 |
| 33 | 196 |

TABLE 2-continued

Encryption Table

| x | A(x) |
|---|---|
| 34 | 70 |
| 35 | 122 |
| 36 | 5 |
| 37 | 0 |
| 38 | 131 |
| 39 | 214 |
| 40 | 208 |
| 41 | 124 |
| 42 | 47 |
| 43 | 114 |
| 44 | 188 |
| 45 | 185 |
| 46 | 27 |
| 47 | 78 |
| 48 | 233 |
| 49 | 52 |
| 50 | 71 |
| 51 | 106 |
| 52 | 181 |
| 53 | 112 |
| 54 | 130 |
| 55 | 198 |
| 56 | 193 |
| 57 | 236 |
| 58 | 95 |
| 59 | 98 |
| 60 | 13 |
| 61 | 169 |
| 62 | 90 |
| 63 | 62 |
| 64 | 24 |
| 65 | 164 |
| 66 | 119 |
| 67 | 75 |
| 68 | 101 |
| 69 | 224 |
| 70 | 227 |
| 71 | 7 |
| 72 | 113 |
| 73 | 92 |
| 74 | 254 |
| 75 | 82 |
| 76 | 189 |
| 77 | 153 |
| 78 | 123 |
| 79 | 46 |
| 80 | 73 |
| 81 | 20 |
| 82 | 167 |
| 83 | 74 |
| 84 | 21 |
| 85 | 80 |
| 86 | 19 |
| 87 | 166 |
| 88 | 96 |
| 89 | 204 |
| 90 | 191 |
| 91 | 66 |
| 92 | 76 |
| 93 | 137 |
| 94 | 171 |
| 95 | 30 |
| 96 | 249 |
| 97 | 132 |
| 98 | 215 |
| 99 | 43 |
| 100 | 228 |
| 101 | 192 |
| 102 | 67 |
| 103 | 231 |
| 104 | 209 |
| 105 | 60 |
| 106 | 239 |
| 107 | 50 |
| 108 | 29 |
| 109 | 248 |
| 110 | 219 |
| 111 | 14 |
| 112 | 168 |
| 113 | 244 |
| 114 | 182 |
| 115 | 42 |
| 116 | 117 |
| 117 | 48 |
| 118 | 115 |
| 119 | 134 |
| 120 | 129 |
| 121 | 172 |
| 122 | 31 |
| 123 | 34 |
| 124 | 205 |
| 125 | 104 |
| 126 | 11 |
| 127 | 143 |
| 128 | 89 |
| 129 | 100 |
| 130 | 55 |
| 131 | 26 |
| 132 | 37 |
| 133 | 160 |
| 134 | 242 |
| 135 | 118 |
| 136 | 240 |
| 137 | 28 |
| 138 | 79 |
| 139 | 195 |
| 140 | 125 |
| 141 | 216 |
| 142 | 202 |
| 143 | 238 |
| 144 | 9 |
| 145 | 212 |
| 146 | 103 |
| 147 | 10 |
| 148 | 116 |
| 149 | 16 |
| 150 | 162 |
| 151 | 102 |
| 152 | 225 |
| 153 | 140 |
| 154 | 110 |
| 155 | 2 |
| 156 | 45 |
| 157 | 72 |
| 158 | 107 |
| 159 | 111 |
| 160 | 56 |
| 161 | 68 |
| 162 | 151 |
| 163 | 250 |
| 164 | 133 |
| 165 | 128 |
| 166 | 3 |
| 167 | 86 |
| 168 | 145 |
| 169 | 252 |
| 170 | 175 |
| 171 | 163 |
| 172 | 221 |
| 173 | 184 |
| 174 | 155 |
| 175 | 206 |
| 176 | 105 |
| 177 | 180 |
| 178 | 199 |
| 179 | 234 |
| 180 | 53 |
| 181 | 49 |
| 182 | 51 |
| 183 | 23 |

TABLE 2-continued

Encryption Table

| x | A(x) |
|---|---|
| 184 | 65 |
| 185 | 108 |
| 186 | 223 |
| 187 | 226 |
| 188 | 141 |
| 189 | 40 |
| 190 | 203 |
| 191 | 190 |
| 192 | 25 |
| 193 | 36 |
| 194 | 38 |
| 195 | 218 |
| 196 | 4 |
| 197 | 33 |
| 198 | 99 |
| 199 | 54 |
| 200 | 241 |
| 201 | 220 |
| 202 | 15 |
| 203 | 210 |
| 204 | 61 |
| 205 | 152 |
| 206 | 251 |
| 207 | 174 |
| 208 | 201 |
| 209 | 245 |
| 210 | 39 |
| 211 | 59 |
| 212 | 149 |
| 213 | 17 |
| 214 | 147 |
| 215 | 247 |
| 216 | 161 |
| 217 | 109 |
| 218 | 63 |
| 219 | 194 |
| 220 | 237 |
| 221 | 8 |
| 222 | 58 |
| 223 | 158 |
| 224 | 121 |
| 225 | 229 |
| 226 | 87 |
| 227 | 186 |
| 228 | 69 |
| 229 | 64 |
| 230 | 18 |
| 231 | 22 |
| 232 | 81 |
| 233 | 93 |
| 234 | 222 |
| 235 | 178 |
| 236 | 157 |
| 237 | 120 |
| 238 | 91 |
| 239 | 142 |
| 240 | 41 |
| 241 | 213 |
| 242 | 135 |
| 243 | 170 |
| 244 | 148 |
| 245 | 176 |
| 246 | 243 |
| 247 | 6 |
| 248 | 1 |
| 249 | 77 |
| 250 | 159 |
| 251 | 211 |
| 252 | 44 |
| 253 | 232 |
| 254 | 139 |
| 255 | 126 |

TABLE 3

Decryption Table

| x | B(x) |
|---|---|
| 0 | 37 |
| 1 | 248 |
| 2 | 155 |
| 3 | 166 |
| 4 | 196 |
| 5 | 36 |
| 6 | 247 |
| 7 | 71 |
| 8 | 221 |
| 9 | 144 |
| 10 | 147 |
| 11 | 126 |
| 12 | 25 |
| 13 | 60 |
| 14 | 111 |
| 15 | 202 |
| 16 | 149 |
| 17 | 213 |
| 18 | 230 |
| 19 | 86 |
| 20 | 81 |
| 21 | 84 |
| 22 | 231 |
| 23 | 183 |
| 24 | 64 |
| 25 | 192 |
| 26 | 131 |
| 27 | 46 |
| 28 | 137 |
| 29 | 108 |
| 30 | 95 |
| 31 | 122 |
| 32 | 5 |
| 33 | 197 |
| 34 | 123 |
| 35 | 6 |
| 36 | 193 |
| 37 | 132 |
| 38 | 194 |
| 39 | 210 |
| 40 | 189 |
| 41 | 240 |
| 42 | 115 |
| 43 | 99 |
| 44 | 252 |
| 45 | 156 |
| 46 | 79 |
| 47 | 42 |
| 48 | 117 |
| 49 | 181 |
| 50 | 107 |
| 51 | 182 |
| 52 | 49 |
| 53 | 180 |
| 54 | 199 |
| 55 | 130 |
| 56 | 160 |
| 57 | 32 |
| 58 | 222 |
| 59 | 211 |
| 60 | 105 |
| 61 | 204 |
| 62 | 63 |
| 63 | 218 |
| 64 | 229 |
| 65 | 184 |
| 66 | 91 |
| 67 | 102 |
| 68 | 161 |
| 69 | 228 |
| 70 | 34 |
| 71 | 50 |
| 72 | 157 |
| 73 | 80 |
| 74 | 83 |

TABLE 3-continued

Decryption Table

| x | B(x) |
|---|---|
| 75 | 67 |
| 76 | 92 |
| 77 | 249 |
| 78 | 47 |
| 79 | 138 |
| 80 | 85 |
| 81 | 232 |
| 82 | 75 |
| 83 | 22 |
| 84 | 17 |
| 85 | 20 |
| 86 | 167 |
| 87 | 226 |
| 88 | 13 |
| 89 | 128 |
| 90 | 62 |
| 91 | 238 |
| 92 | 73 |
| 93 | 233 |
| 94 | 31 |
| 95 | 58 |
| 96 | 88 |
| 97 | 24 |
| 98 | 59 |
| 99 | 198 |
| 100 | 129 |
| 101 | 68 |
| 102 | 151 |
| 103 | 146 |
| 104 | 125 |
| 105 | 176 |
| 106 | 51 |
| 107 | 158 |
| 108 | 185 |
| 109 | 217 |
| 110 | 154 |
| 111 | 159 |
| 112 | 53 |
| 113 | 72 |
| 114 | 43 |
| 115 | 118 |
| 116 | 148 |
| 117 | 116 |
| 118 | 135 |
| 119 | 66 |
| 120 | 237 |
| 121 | 224 |
| 122 | 35 |
| 123 | 78 |
| 124 | 41 |
| 125 | 140 |
| 126 | 255 |
| 127 | 15 |
| 128 | 165 |
| 129 | 120 |
| 130 | 54 |
| 131 | 38 |
| 132 | 97 |
| 133 | 164 |
| 134 | 119 |
| 135 | 242 |
| 136 | 16 |
| 137 | 93 |
| 138 | 19 |
| 139 | 254 |
| 140 | 153 |
| 141 | 188 |
| 142 | 239 |
| 143 | 127 |
| 144 | 21 |
| 145 | 168 |
| 146 | 11 |
| 147 | 214 |
| 148 | 244 |
| 149 | 212 |
| 150 | 18 |
| 151 | 162 |
| 152 | 205 |
| 153 | 77 |
| 154 | 3 |
| 155 | 174 |
| 156 | 9 |
| 157 | 236 |
| 158 | 223 |
| 159 | 250 |
| 160 | 133 |
| 161 | 216 |
| 162 | 150 |
| 163 | 171 |
| 164 | 65 |
| 165 | 4 |
| 166 | 87 |
| 167 | 82 |
| 168 | 112 |
| 169 | 61 |
| 170 | 243 |
| 171 | 94 |
| 172 | 121 |
| 173 | 28 |
| 174 | 207 |
| 175 | 170 |
| 176 | 245 |
| 177 | 8 |
| 178 | 235 |
| 179 | 27 |
| 180 | 177 |
| 181 | 52 |
| 182 | 114 |
| 183 | 2 |
| 184 | 173 |
| 185 | 45 |
| 186 | 227 |
| 187 | 14 |
| 188 | 44 |
| 189 | 76 |
| 190 | 191 |
| 191 | 90 |
| 192 | 101 |
| 193 | 56 |
| 194 | 219 |
| 195 | 139 |
| 196 | 33 |
| 197 | 1 |
| 198 | 55 |
| 199 | 178 |
| 200 | 29 |
| 201 | 208 |
| 202 | 142 |
| 203 | 190 |
| 204 | 89 |
| 205 | 124 |
| 206 | 175 |
| 207 | 10 |
| 208 | 40 |
| 209 | 104 |
| 210 | 203 |
| 211 | 251 |
| 212 | 145 |
| 213 | 241 |
| 214 | 39 |
| 215 | 98 |
| 216 | 141 |
| 217 | 0 |
| 218 | 195 |
| 219 | 110 |
| 220 | 201 |
| 221 | 172 |
| 222 | 234 |
| 223 | 186 |
| 224 | 69 |

TABLE 3-continued

Decryption Table

| x | B(x) |
|---|---|
| 225 | 152 |
| 226 | 187 |
| 227 | 70 |
| 228 | 100 |
| 229 | 225 |
| 230 | 23 |
| 231 | 103 |
| 232 | 253 |
| 233 | 48 |
| 234 | 179 |
| 235 | 30 |
| 236 | 57 |
| 237 | 220 |
| 238 | 143 |
| 239 | 106 |
| 240 | 136 |
| 241 | 200 |
| 242 | 134 |
| 243 | 246 |
| 244 | 113 |
| 245 | 209 |
| 246 | 7 |
| 247 | 215 |
| 248 | 109 |
| 249 | 96 |
| 250 | 163 |
| 251 | 206 |
| 252 | 169 |
| 253 | 12 |
| 254 | 74 |
| 255 | 26 |

The above mentioned Table 1 is an example of the random number table according to this embodiment. The Table 2 is an encryption table when the common key is "15" in this embodiment. The Table 3 is a decryption table when the common key is "15" in this embodiment.

In the above mentioned embodiment, the encryption process and the decryption process are performed by the conversion system using the tables. This system requires a smaller load in performing an operation, thereby preventing the printing speed from being reduced.

Furthermore, according to this embodiment, the recording device manages both print ID and common key. Therefore, when the recording device is connected to a plurality of host computers, the print process can be performed in the transfer order of print control data regardless of the common key issue order.

Other Embodiments

In the above mentioned embodiments, an encryption table is generated by converting a random number table using a common key, but the encryption table can be the common key. Furthermore, the common key can be used as a parameter in the congruential method, and an encryption table can be generated by generating pseudo random numbers.

The encryption table may be generated by conversion using the common key according to not only the congruential method but also an average method. Since a common key of a specified value can be issued in the above mentioned embodiments, the value of an internal timer of the recording device can be used.

An example of the configuration of the image data recording system embodying the present invention is described below by referring to the block diagram shown in FIG. 7.

Figure 7:
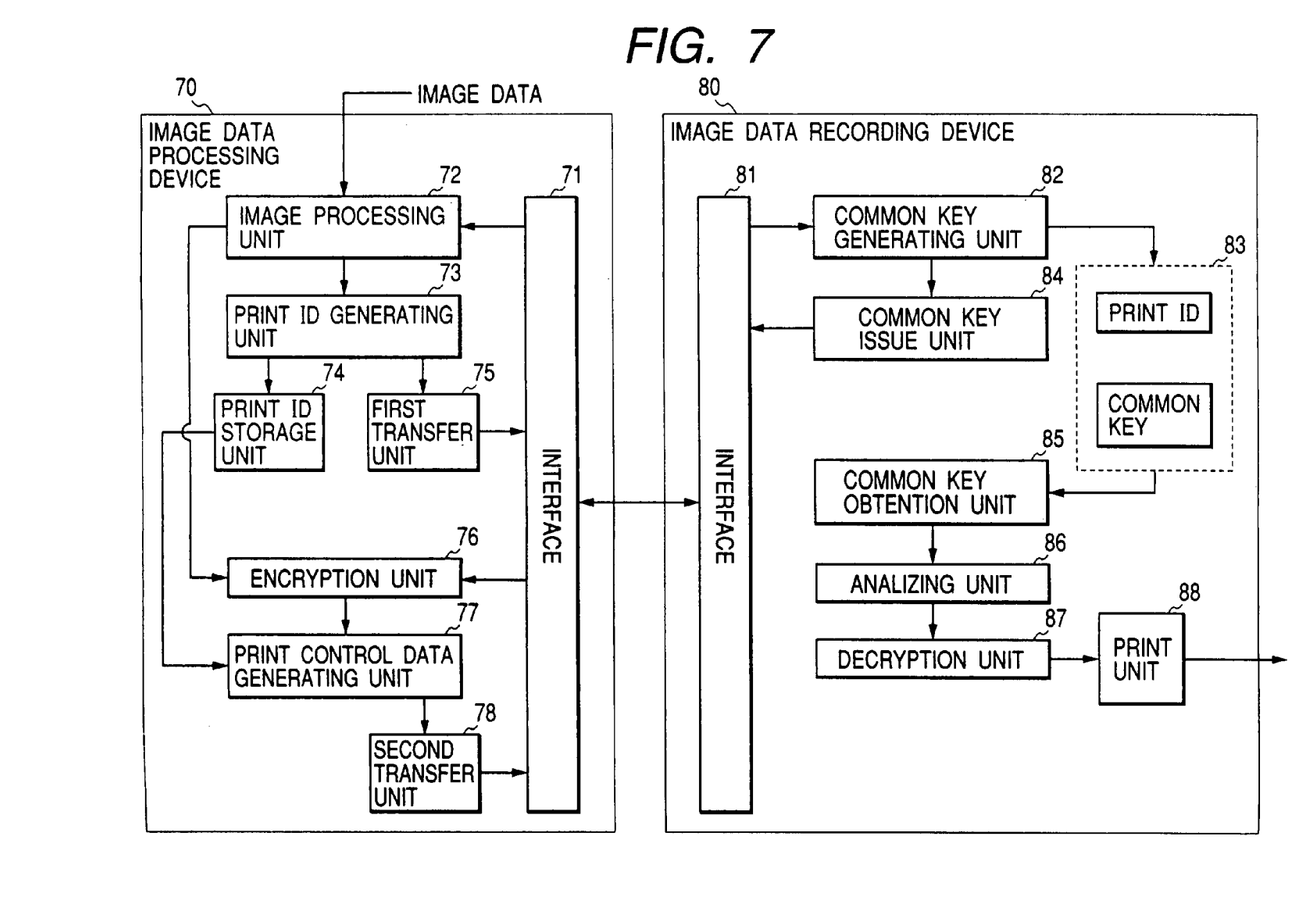
FIG. 7 is a block diagram of an example of the configuration of the image data recording system realizing the present invention.

In FIG. 7, reference numeral 70 denotes an image data processing device; reference numeral 71 denotes an interface; reference numeral 72 denotes an image processing unit; reference numeral 73 denotes a print ID generating unit; reference numeral 74 denotes a print ID storage unit; reference numeral 75 denotes a first transfer unit; reference numeral 76 denotes an encryption unit; reference numeral 77 denotes a print control data generating unit; and reference numeral 78 denotes a second transfer unit.

Furthermore, reference numeral 80 denotes an image data recording device; reference numeral 81 denotes an interface; reference numeral 82 denotes a common key generating unit; reference numeral 83 denotes a management unit; reference numeral 84 denotes a common key issue unit; reference numeral 85 denotes a common key obtaining unit; reference numeral 86 denotes an analyzing unit; reference numeral 87 denotes a decryption unit; and reference numeral 88 denotes a print unit.

As shown in FIG. 7, the image data recording system comprises the image data processing device 70 and the image data recording device 80. Through the interface 71 and the interface 81 respectively provided in the image data processing device 70 and the image data recording device 80, various data and commands are transmitted and received to print the image data input to the image data processing device 70 on the image data recording device 80, and then output.

In FIG. 7, the image processing unit 72 performs the image process including the forgery preventing process on the input image data. The print ID generating unit 73 generates a print ID corresponding to the image data processed by the image processing unit 72 in the forgery preventing process. The generated print ID is stored in the print ID storage unit 74, and transferred by the first transfer unit 75 to the image data recording device 80.

The encryption unit 76 encrypts the image data processed by the image processing unit 72 in the predetermined processes using the common key transmitted from the image data recording device 80. The print control data generating unit 77 generates print control data by converting the print image data encrypted by the encryption unit 76 into a print control command. Then, the generated print control data and the print ID generated by the print ID generating unit 73 and stored in the print ID storage unit 74 are transferred by the second transfer unit 78 to the image data recording device 80.

The common key generating unit 82 generates a common key based on the print ID transferred from the image data processing device 70. Then, the generated common key and the transferred print ID are stored and managed in the memory of the management unit 83.

The common key issue unit 84 transmits the common key generated by the common key generating unit 82 to the image data processing device 70. When the print ID and the print control data are transmitted from the image data processing device 70, the common key obtaining unit 85 obtains a common key corresponding to the print ID from the management unit 83.

The analyzing unit 86 analyzes the command of the above mentioned print data using the common key obtained by the common key obtaining unit 85, and extracts the encrypted print image data. The decryption unit 87 decrypts the print image data extracted by the analyzing unit 86 using the common key obtained by the common key obtaining unit 85. Then, the decrypted print image data is stored in a storage medium (not shown in the attached drawings) by the print unit 88.

Other Embodiments according to the Present Invention

The present invention can be applied to either a system comprising a plurality of appliances (for example, a host computer, an interface appliance, a leader, a printer, etc.) or a device comprising one appliance.

In addition, the present invention further includes an embodiment in which a program code of software for realizing the functions of the above mentioned embodiments are provided for the computer in the device or the system connected to each of the above mentioned devices so that various devices can be operated to realize the functions of the above mentioned embodiments, and the above mentioned devices are operated according to the program stored in the computer (CPU or MPU) of the system or the device.

In this case, the program code of the software realizes the functions of the above mentioned embodiment, and the program code itself and the unit for providing the program code for the computer, for example, a storage medium storing the program code constitute the present invention. The storage medium storing the program code can be, for example, a floppy disk, a hard disk, an optical disk, a magneto-optical disk, CD-ROM, a magnetic tape, a non-volatile memory card, ROM, etc.

In addition, it is needless to say that the program code is included in the embodiment of the present invention not only in the case where the function described in the above description of the embodiment is realized by a computer executing the program code provided thereto, but also in the case the function is realized by the program code cooperating with the OS (operating system) or other application software operating in the computer.

Furthermore, after the provided program code is stored in the memory in a function extension board of a computer or a function extension unit connected to the computer, the CPU, etc. provided in the function extension board or the function extension unit can perform all or part of an actual process at an instruction of the program code to realize the function of the above mentioned embodiment in the process. The present invention can also include the above mentioned case.

As described above, the print control data is encrypted using a common key issued by an image data recording device. Therefore, when the image data processing device generates a recording image by controlling the image data recording device, the image data recording device which has issued the common key is required, thereby effectively preventing a number of unspecified image data recording devices from printing image data, and ensuring that the forgery preventing process is performed by the image data processing device. Thus, the forgery of bills, valuable securities, etc. can be prevented without fail.

What is claimed is:

1. An image data recording device, comprising:
   common key generating means for generating a common key based on a print ID transferred from an image data processing device;
   management means for managing the common key generated by said common key generating means and the print ID transferred from said image data processing device in pairs;
   common key issue means for transmitting the common key generated by said common key generating means to said image data processing device;
   common key obtaining means for obtaining the common key corresponding to the print ID from said management means when the print ID and print control data are transmitted from said image data processing device;
   analyzing means for analyzing the print control data to extract print image data from the print control data wherein said print image data that has been forgery-preventing-image-processed, encrypted, and converted into a command in the image data processing device;
   decryption means for decrypting the encrypted print image data extracted by said analyzing means using a key corresponding to the print ID; and
   print means for recording the print image data decrypted by said decryption means on a recording medium,
   wherein the print image data has been forgery-preventing-image-processed and encrypted in the image data processing device using the common key received from said image data recording device.

2. The apparatus according to claim 1, wherein said common key generating means generates the common key without regularity independent of a value of the print ID.

3. The apparatus according to claim 1, wherein said decryption means performs a decryption process using a conversion table generated using said key corresponding to the print ID.

4. A method for controlling an image data recording device, comprising the steps of:
   generating a common key based on a print ID transferred from an image data processing device;
   managing the generated common key and the print ID transferred from the image data processing device in pairs;
   transmitting the generated common key to the image data processing device;
   obtaining the common key corresponding to the print ID when the print ID and print control data are transmitted from the image data processing device;
   analyzing the print control data to extract print image data from the print control data wherein said print image data that has been forgery-preventing-processed, encrypted, and converted into a command in the image data processing device;
   decrypting the extracted, encrypted print image data using a key obtained from the print ID; and
   recording the decrypted print image data in a storage medium,
   wherein the print image data has been forgery-preventing-image-processed and encrypted in the image data processing device using the common key received from the image data recording device.

5. The method according to claim 4, wherein
   said common key generating step generates the common key without regularity independent of a value of the print ID.

6. The method according to claim 4, wherein
   said decrypting step performs a decryption process using a conversion table generated using the key obtained from the print ID.

7. A program, embodied in a computer-readable medium, for controlling an image data recording system including an image data processing device, said program comprising a plurality of program codes instructing the image data processing system to perform the steps of:
   generating a common key based on a print ID transferred from the image data processing device;
   managing the generated common key and the print ID transferred from the image data processing device in pairs;

transmitting the generated common key to the image data processing device;

obtaining the common key corresponding to the print ID when the print ID and print control data are transmitted from the image data processing device;

analyzing the print control data to extract print image data from the print control data wherein said print image data that has been forgery-preventing-image-processed, encrypted, and converted into a command in the image data processing device;

decrypting the extracted, encrypted print image data using a key obtained from the print ID; and recording the decrypted print image data in a storage medium, wherein the print image data has been forgery-preventing-image-processed and encrypted in the image data processing device using the common key received from the image data recording device.

* * * * *